Nov. 27, 1928.
R. K. POTTER
1,692,904
AMPLIFICATION OF PHOTO ELECTRIC CALL RESPONSE
Filed Aug. 6, 1926
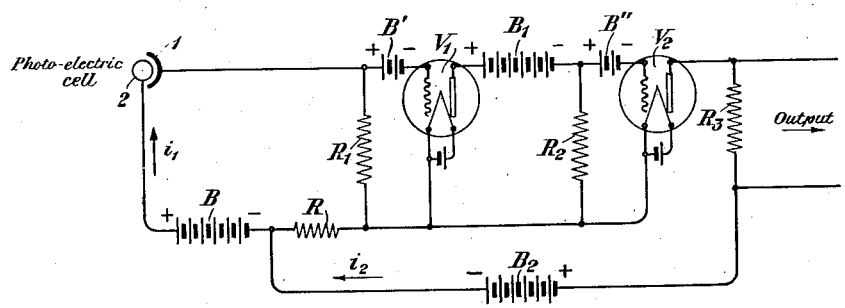
INVENTOR
R. K. Potter
BY
ATTORNEY Patented Nov. 27, 1928.

1,692,904

UNITED STATES PATENT OFFICE.

RALPH K. POTTER, OF NEW YORK, N. Y., ASSIGNOR TO AMERICAN TELEPHONE AND TELEGRAPH COMPANY, A CORPORATION OF NEW YORK.

AMPLIFICATION OF PHOTO-ELECTRIC CELL RESPONSE.

Application filed August 6, 1926. Serial No. 127,675.

This invention relates to the amplification of the response of photo-electric cells, and more particularly to the amplification of the electrical response of photo-electric cells having a photo-sensitive cathode, an anode, and a source of voltage and a resistance connected across the terminals of the electrodes.

It is the object of the invention to provide simple but effective means for amplifying the electrical response of photo-electric cells of the type indicated above, that is, for causing a variation in the intensity of the light falling on the cell cathode to produce a far greater variation in the electric current at the output than has been obtainable heretofore.

The method which I employ for accomplishing the desired result is based in effect upon the regenerative principle, the system being analogous to the ordinary vacuum tube regenerative circuit well understood in the art.

My invention will be more clearly understood when the following detailed description of the circuits and the operation thereof is read with reference to the accompanying drawing showing the circuits in diagrammatic form.

With reference to the details of the drawing, the photo-electric cell, the response of which is to be amplified, includes the photo-sensitive cathode 1 and the anode 2. The structural details of a photo-electric cell of this type are well understood in the art, and accordingly no further description of the cell itself is required herein. Connected between the terminals of the cell electrodes are the battery B and the resistance R. I employ a first amplifier vacuum tube $V_1$ and a second amplifier vacuum tube $V_2$. The usual filament batteries for these tubes are indicated and the batteries B' and B'' furnish the grid biases for the tubes $V_1$ and $V_2$, respectively. A battery $B_1$ is included in the plate circuit of the tube $V_1$, and the battery $B_2$ is connected in the plate circuit of the tube $V_2$, as shown in the drawing. The resistances $R_1$, $R_2$ and $R_3$ are included in the system as shown. The indicated poling of the batteries is to be noted.

The operation of the system in response to an increase in the illumination of the cell is as follows: The increase of the intensity of the incident light causes an instantaneous increase of electron flow, producing an increase of current (in the conventional sense) in the direction indicated by the arrow $i_1$. This increase causes the grid of the tube $V_1$ to go somewhat positive—or, in other words, less negative—with respect to the filament of this tube. This change of grid potential produces an increase of the current flowing in the plate circuit of the tube $V_1$, and the result is that the grid of the tube $V_2$ will go further negative with respect to its filament. The negative change in the grid potential of this tube causes a decrease in the plate current of the tube, this change of current being represented, in the conventional sense, by the arrow $i_2$. It will be understood from an examination of the circuit, as shown in the drawing, that this change of current $i_2$ through the resistance R is negative with respect to the original change of cell current $i_1$ through the resistance R. It is then clear that the voltage drop $i_2 R$ assists the battery B and that the net result of the change through the resistance R is an increase of the voltage impressed across the cell electrode terminals. This voltage increase, of course, causes a greater flow of current through the resistance $R_1$, and the operation is repeated. It will be understood that the change in the cell current ($i_1$) is limited by the relation between the values of the resistances in the circuit and the current amplification of the vacuum tubes.

A decrease in the illumination of the cell produces results which are the reverse of those described above. A decrease in the electron flow causes the grid of the tube $V_1$ to go more negative with respect to its filament. The plate current of this tube is decreased, and the grid of the tube $V_2$ becomes less negative with respect to its filament. An increase in the plate current of the tube $V_2$ results, and the change of current through the resistance R assists the original negative change of cell current, the result being an amplification of the electrical response to the negative variation of incident light intensity.

Thus, by the use of my arrangement of vacuum tubes, sources of voltage, and resistances, connected as shown or in an equivalent manner, there is produced a large amplification of the electrical response of the cell to variations of the incident light intensity and an amplified result at the output based upon the regenerative principle.

While a certain combination of elements and a specific arrangement of the circuit have been described in detail for the purpose of illustration, it is to be understood that changes may be made within the scope of the appended claims without a departure from the spirit of the invention.

What is claimed is:

1. The method of amplifying the electrical response of a photo-electric cell to variation in the quantity of light impressed thereon, which consists in causing a variation of the cell current to produce a responsive current variation in an auxiliary circuit and causing said current variation in the auxiliary circuit to change the voltage across the electrode terminals of the cell so as to assist the variation of the cell current.

2. The method of producing a large electrical response of a photo-electric cell to variation in the quantity of light impressed thereon, which consists in impressing a voltage across the electrode terminals of the cell, setting up a current in an auxiliary circuit, causing a change of the cell current to produce a responsive change in the current flow in the auxiliary circuit, and causing said responsive change to vary the voltage across the electrode terminals of the cell so as to amplify the change in the cell current.

3. In association with a photo-electric cell having a source of voltage connected across its electrode terminals, a plurality of vacuum tube amplifiers, means for varying the plate current of the first of said tubes in response to a similar variation in the cell current, means for producing a responsive variation in the opposite direction in the plate current of the last of said tubes, and means for causing said response variation to amplify the variation in the cell current.

4. In association with a photo-electric cell having a source of voltage connected across its electrode terminals, a plurality of vacuum tube amplifiers, means for varying the plate current of the first of said tubes in response to a similar variation in the cell current, means for producing a responsive variation in the opposite direction in the plate current of the last of said tubes, and means for causing said responsive variation to vary the voltage across the cell electrode terminals so as to amplify the variation in the cell current.

5. In association with a photo-electric cell having a source of voltage connected across its electrode terminals, a first vacuum tube amplifier, a second vacuum tube amplifier, and sources of voltage and resistances associated with said tubes, said tubes, said sources of voltage, and said resistances being so connected electrically with respect to the cell that a variation in the cell current causes a similar variation in the plate current of said first tube, said plate current variation causes a variation in the opposite direction in the plate current of said second tube, and said variation in the plate current of the second tube amplifies the cell current variation.

6. In association with a photo-electric cell having a source of voltage connected across its electrode terminals, a first vacuum tube amplifier, a second vacuum tube amplifier, and sources of voltage and resistances associated with said tubes, said tubes, said sources of voltage, and said resistances being so connected electrically with respect to the cell that a variation in the cell current causes a similar variation in the plate current of said first tube, said plate current variation causes a variation in the opposite direction in the plate current of said second tube, and said variation in the plate current of the second tube varies the voltage across the cell electrode terminals so as to amplify the variation in the cell current.

7. In association with a photo-electric cell, a source of voltage and a resistance connected across the electrode terminals of the cell, a first and a second vacuum tube amplifier electrically connected therewith, means for producing a variation in the plate current of the first tube in response to a similar variation in the cell current, means for producing a responsive variation in the opposite direction in the plate current of the second tube, and means for causing said responsive variation to amplify the variation in the cell current.

8. In association with the photo-electric cell, a source of voltage and a resistance connected across the electrode terminals of the cell, a first and a second vacuum tube amplifier electrically connected therewith, means for producing a variation in the plate current of the first tube in response to a similar variation in the cell current, means for producing a responsive variation in the opposite direction in the plate current of the second tube, and means for causing said responsive variation to vary the voltage across the cell electrode terminals so as to amplify the variation in the cell current.

In testimony whereof, I have signed my name to this specification this 4th day of August, 1926.

RALPH K. POTTER.